United States Patent
Jeong et al.

(10) Patent No.: US 11,356,545 B2
(45) Date of Patent: Jun. 7, 2022

(54) COMMUNICATION TERMINAL AND METHOD OF PROVIDING UNIFIED INTERFACE TO THE SAME

(71) Applicants: Samsung Electronics Co., Ltd., Suwon-si (KR); Sogang University Research & Commercialization Foundation, Seoul (KR)

(72) Inventors: Myeong Gi Jeong, Incheon (KR); Young Hee Park, Seoul (KR); Kwang Choon Kim, Gyeonggi-do (KR); Jung Yun Seo, Seoul (KR); Choong Nyoung Seon, Seoul (KR)

(73) Assignees: Samsung Electronics Co., Ltd., Suwon-si (KR); Sogang University Research & Commercialization Foundation, Seoul (KR)

( * ) Notice: Subject to any disclaimer, the term of this patent is extended or adjusted under 35 U.S.C. 154(b) by 0 days.

(21) Appl. No.: 16/909,397

(22) Filed: Jun. 23, 2020

(65) Prior Publication Data

US 2020/0322471 A1     Oct. 8, 2020

Related U.S. Application Data

(63) Continuation of application No. 16/103,496, filed on Aug. 14, 2018, now abandoned, which is a (Continued)

(30) Foreign Application Priority Data

Apr. 14, 2008  (KR) .................. 10-2008-0034361

(51) Int. Cl.
*H04M 1/2753*  (2020.01)
*G06F 16/332*  (2019.01)
(Continued)

(52) U.S. Cl.
CPC ........ *H04M 1/2753* (2020.01); *G06F 3/0481* (2013.01); *G06F 16/3322* (2019.01);
(Continued)

(58) Field of Classification Search
CPC ........... H04M 1/2753; H04M 1/72403; H04M 1/72436; H04M 1/72445; H04M 1/72451;
(Continued)

(56) References Cited

U.S. PATENT DOCUMENTS 5,859,636 A   1/1999   Pandit
5,946,647 A   8/1999   Miller et al.
(Continued)

FOREIGN PATENT DOCUMENTS

CN    1692399 A    11/2005
CN    1703664 A    11/2005
(Continued)

OTHER PUBLICATIONS

Extended European Search Report dated May 16, 2019, issued in European Application No. 19163061.5.
Chapter 2 Related Work, Jul. 1, 2001, XP055270642, pp. 13-22.

*Primary Examiner* — Quoc A Tran
(74) *Attorney, Agent, or Firm* — Jefferson IP Law, LLP

(57) ABSTRACT

A communication terminal and a method of providing a unified natural language interface to the same are disclosed. The method includes: determining, when text information containing many characters is created, whether the text information conforms to one of preset grammatical constraints; extracting, when the text information conforms to one of the grammatical constraints, tokens of one or more of characters from the text information, and extracting, when the text information does not conform to one of the grammatical constraints, one or more characters having an attribute probability higher than a reference probability as a
(Continued)

(a)

(b)

token; and analyzing the extracted tokens to determine a function to handle the extracted tokens, and executing the determined function based on the extracted tokens.

18 Claims, 8 Drawing Sheets

Related U.S. Application Data continuation of application No. 15/279,832, filed on Sep. 29, 2016, now Pat. No. 10,067,631, which is a continuation of application No. 12/423,069, filed on Apr. 14, 2009, now abandoned.

(51) Int. Cl.
| | |
|---|---|
| *H04L 51/046* | (2022.01) |
| *H04L 51/56* | (2022.01) |
| *G06F 40/103* | (2020.01) |
| *G06F 40/166* | (2020.01) |
| *G06F 40/279* | (2020.01) |
| *G06F 40/284* | (2020.01) |
| *H04M 1/72403* | (2021.01) |
| *H04M 1/72436* | (2021.01) |
| *H04M 1/72445* | (2021.01) |
| *H04M 1/72451* | (2021.01) |
| *G06F 3/0481* | (2022.01) |
| *H04M 1/7243* | (2021.01) |
| *G06F 17/00* | (2019.01) |

(52) U.S. Cl.
CPC .......... *G06F 40/103* (2020.01); *G06F 40/166* (2020.01); *G06F 40/279* (2020.01); *G06F 40/284* (2020.01); *H04L 51/046* (2013.01); *H04L 51/36* (2013.01); *H04M 1/72403* (2021.01); *H04M 1/72436* (2021.01); *H04M 1/72445* (2021.01); *H04M 1/72451* (2021.01); *G06F 2203/04803* (2013.01); *H04M 1/7243* (2021.01)

(58) Field of Classification Search
CPC . H04M 1/7243; H04M 1/2757; G06F 40/103; G06F 40/166; G06F 40/279; G06F 40/284; G06F 16/3322; G06F 3/0481; G06F 2203/04803; H04L 51/046; H04L 51/36
See application file for complete search history.

(56) References Cited

U.S. PATENT DOCUMENTS

| | | | |
|---|---|---|---|
| 6,047,260 A | 4/2000 | Levinson | |
| 6,094,681 A | 7/2000 | Shaffer et al. | |
| 6,346,952 B1* | 2/2002 | Shtivelman | H04M 3/5191 |
| | | | 715/758 |
| 6,901,399 B1 | 5/2005 | Corston et al. | |
| 7,328,146 B1 | 2/2008 | Alshawi et al. | |
| 7,475,006 B2 | 1/2009 | Weise | |
| 7,496,500 B2 | 2/2009 | Reed et al. | |
| 7,526,466 B2 | 4/2009 | Au | |
| 7,539,677 B1* | 5/2009 | Wong | G06F 16/904 |
| 7,912,705 B2* | 3/2011 | Wasson | G06F 40/289 |
| | | | 704/9 |
| 7,917,843 B2 | 3/2011 | Hedloy | |
| 8,126,484 B2 | 2/2012 | Scott et al. | |
| 2002/0049868 A1* | 4/2002 | Okada | G06F 16/313 |
| | | | 719/330 |
| 2003/0095102 A1 | 5/2003 | Kraft et al. | |
| 2003/0182310 A1* | 9/2003 | Charnock | G06Q 10/10 |
| 2004/0148170 A1 | 7/2004 | Acero et al. | |
| 2004/0236749 A1 | 11/2004 | Cortright et al. | |
| 2005/0066269 A1 | 3/2005 | Wang et al. | |
| 2005/0079861 A1 | 4/2005 | Lim | |
| 2005/0086219 A1 | 4/2005 | Martin | |
| 2005/0156947 A1 | 7/2005 | Sakai et al. | |
| 2006/0010379 A1 | 1/2006 | Kashi | |
| 2006/0056601 A1 | 3/2006 | Herron et al. | |
| 2007/0073810 A1 | 3/2007 | Adams et al. | |
| 2007/0100604 A1 | 5/2007 | Calcagno et al. | |
| 2007/0192085 A1 | 8/2007 | Roulland et al. | |
| 2008/0071520 A1 | 3/2008 | Sanford | |
| 2008/0080687 A1 | 4/2008 | Broms et al. | |
| 2008/0109719 A1* | 5/2008 | Osawa | G06F 40/205 |
| | | | 715/273 |
| 2008/0125148 A1 | 5/2008 | Zhao et al. | |
| 2008/0147578 A1 | 6/2008 | Leffingwell et al. | |
| 2008/0147588 A1 | 6/2008 | Leffingwell et al. | |
| 2008/0161058 A1 | 7/2008 | Park et al. | |
| 2008/0177721 A1 | 7/2008 | Agarwal et al. | |
| 2008/0214217 A1 | 9/2008 | Chen et al. | |
| 2008/0228496 A1 | 9/2008 | Yu et al. | |
| 2008/0301042 A1 | 12/2008 | Patzer | |
| 2009/0061825 A1* | 3/2009 | Neelakantan | H04L 61/2069 |
| | | | 455/412.1 |
| 2009/0125365 A1 | 5/2009 | Masselle et al. | |

FOREIGN PATENT DOCUMENTS

| | | |
|---|---|---|
| CN | 101022591 A | 8/2007 |
| JP | 2002-50992 A | 2/2002 |
| KR | 10-2005-0034980 A | 4/2005 |
| KR | 10-2007-0023014 A | 2/2007 |
| KR | 10-0790786 B1 | 1/2008 |
| WO | 2007/102045 A1 | 9/2007 |

* cited by examiner

FIG. 7A

SHORT MESSAGE

SEE YOU AT LMN PARK
APRIL 5 12H

3/29 10:30 AM JANE
Jane

MENU | REPLY | OK (a)

SCHEDULE

20080405

1200

JANE LMN PARK

MENU | | OK (b)

FIG. 7B

SHORT MESSAGE

AA CARD APPROVED APRIL
01 11H40M BB GAS
STATION 50,000

4/1 11:45 AM
AA CARD

MENU | REPLY | OK (a)

HOUSEKEEPING BOOK

20080401

| INCOMINGS/OUTGOINGS | ITEMS | AMOUNT | REMARKS |
|---|---|---|---|
| − | BB GAS STATION | 50,000WON | AA CARD |
| + | POCKET MONEY | 100,000WON | |
| | | | |

EDIT | | OK (b)

(a)

(b)

(a)

(b)

COMMUNICATION TERMINAL AND METHOD OF PROVIDING UNIFIED INTERFACE TO THE SAME

CROSS REFERENCE TO RELATED APPLICATIONS

This application is a continuation application of prior application Ser. No. 16/103,496, filed on Aug. 14, 2018; which is a continuation of prior application Ser. No. 15/279,832, filed on Sep. 29, 2016, which issued as U.S. Pat. No. 10,067,631 on Sep. 4, 2018; which is a continuation application of prior application Ser. No. 12/423,069, filed on Apr. 14, 2009; which claims priority under 35 U.S.C. § 119(a) of a Korean patent application 10-2008-0034361, filed on Apr. 14, 2008, in the Korean Intellectual Property Office, the entire disclosure of which are hereby incorporated by reference.

BACKGROUND

1. Field of the Invention

The present invention relates to the field of text information processing and, more particularly, to a communication terminal that enables extraction of tokens from text information generated by one function so that the extracted tokens can be used for another function, and to a method of providing a unified interface for the same.

2. Description of the Related Art

Advanced communication terminals are capable of performing composition functions. For example, in addition to call processing, a communication terminal provides various supplementary functions related to message transmission, wireless Internet, phonebook management, housekeeping book management, and schedule management. However, the communication terminal manages text information in a manner specific to each function. For example, received messages are managed separately from other functions. Created schedules are managed separately from other functions. In addition, the communication terminal provides different user interface tools for different functions, and the user may have to become familiar to different user interface tools for different functions.

In such a communication terminal, text information is not shared between different functions. For example, a received message cannot be used to create a schedule. Hence, the communication terminal has to manage text information for each function in a piecewise manner, complicating text information management.

SUMMARY

The present invention provides a communication terminal that enables sharing of text information between different functions, and a method of providing a unified interface for the same.

In accordance with an exemplary embodiment of the present invention, there is provided a method of providing a unified interface to a communication terminal, including: determining, when text information containing many characters is created, whether the text information conforms to one of preset grammatical constraints; extracting, when the text information conforms to one of the grammatical constraints, tokens of one or more of characters from the text information, and extracting, when the text information does not conform to one of the grammatical constraints, one or more characters having an attribute probability higher than a reference probability as a token; and analyzing the extracted tokens to determine a function to handle the extracted tokens, and executing the determined function based on the extracted tokens.

In accordance with another exemplary embodiment of the present invention, there is provided a method of providing a unified interface to a communication terminal, including: extracting, when a communication message containing text information composed of multiple characters is created, one or more characters having an attribute probability higher than a reference probability as a token by analyzing pre-stored attribute probabilities of consecutive characters; and executing a schedule entry function through rearrangement of extracted tokens.

In accordance with another exemplary embodiment of the present invention, there is provided a method of providing a unified interface to a communication terminal, including: determining, when text information containing many characters is created, whether one or more consecutive characters are equal to an attribute keyword; extracting, when one or more consecutive characters are equal to an attribute keyword, two or more consecutive characters immediately following the attribute keyword as a token; and selecting a function to process the extracted token on the basis of the attribute keyword, and executing the selected function using the extracted token.

In accordance with another exemplary embodiment of the present invention, there is provided a communication terminal including: a text information classifier determining, when text information containing many characters is created, whether the text information conforms to one of preset grammatical constraints; a grammatical extractor extracting, when the text information conforms to one of the grammatical constraints, tokens of one or more of characters from the text information; a non-grammatical extractor analyzing, when the text information does not conform to one of the grammatical constraints, pre-stored attribute probabilities of consecutive characters, and extracting one or more characters having an attribute probability higher than a reference probability as a token; and a token processor analyzing the extracted tokens for determining a function to handle the extracted tokens, and executing the determined function based on the extracted tokens.

In a feature of the present invention, the communication terminal provides a unified interface. In the communication terminal, when a piece of text information is created through one function, tokens can be extracted from the piece of text information and input to another function for further processing. Hence, text information can be shared between multiple functions, and the user can easily manage text information in the communication terminal.

BRIEF DESCRIPTION OF THE DRAWINGS

The features and advantages of the present invention will be more apparent from the following detailed description in conjunction with the accompanying drawings, in which:

FIG. 7A, FIG. 7B, FIG. 7C and FIG. 7D are screen representations for the method of FIG. 6;

DETAILED DESCRIPTION OF THE INVENTION

Figure 1:
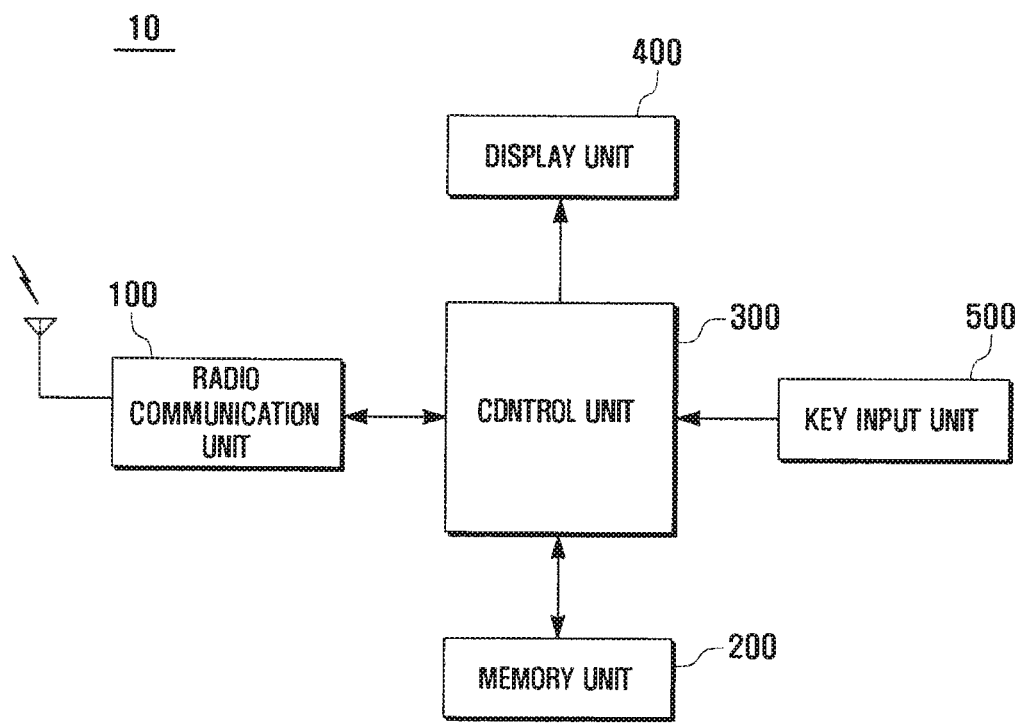
FIG. 1 is a block diagram of a communication terminal according to an exemplary embodiment of the present invention.

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

In the description, the term "function" refers to a behavioral operation carried out by an application program in the communication terminal. A function may be, for example, related to call processing, message transmission and reception, wireless Internet, phonebook management, housekeeping book management, schedule management, or navigation. It would be recognized that the list of function shown is not to be considered limiting and other functions may benefit from the integration of operations disclosed in the present invention.

The term "text information" refers to strings of characters composed of numbers, symbols, Hangul and English characters, as well as characters and symbols of other languages, e.g., Greek, Russian, etc., and can be created through a particular function of a communication terminal. Text information can be received from the outside, or generated by the communication terminal. Text information can be contained in communication messages such as short messages, multimedia messages, voice mails and e-mail messages. Text information can be created by executing a text composition tool of the communication terminal. Voice mail messages may be translated into text information prior to being operated on by the invention disclosed herein. Such voice to text conversion is well-known in the art and need not be discussed herein.

The term "tokens" refers to a piece of data composed of one or more consecutive characters in text information. Tokens can be a morpheme or word. In the communication terminal, tokens can be defined by pre-selected attributes such as date, time, currency, name, place, phone number, and command for function invocation and execution. Tokens may be separated from each other by regular characters, white spaces, and/or delimiters.

The term "descriptive data" refers to data describing text information from the time of creation. For example, creation date and creation time of the text information or identification information for the text information like writer or recipient can be descriptive data.

The term "grammatical constraint" denotes a rule for arranging tokens in text information. That is, a grammatical constraint indicates that positions of tokens to be extracted are preset in text information. A grammatical constraint can be set in relation to an "attribute keyword". Here, an attribute keyword is an identification keyword separating first text information from second text information. An attribute keyword can be a token contained in text information. An attribute keyword can also be a command for invoking and executing a function that handles tokens to be extracted from text information.

The term "attribute probability" is a number assigned to at least one character in text information to indicate the possibility that the character forms a token. Attribute probabilities can be divided into first attribute probabilities and second attribute probabilities. A first attribute probability is a number indicating the possibility that a single character forms a token. A second attribute probability is a number indicating the possibility that two or more consecutive characters form a token. In addition, the term "reference probability" is a preset number to be compared with an attribute probability. A reference probability is used as a reference to check whether a particular character forms a token.

FIG. 1 is a block diagram of a communication terminal according to an exemplary embodiment of the present invention. In the description, the communication terminal is assumed to be a mobile phone. However, the communication terminal may be any type of terminal that can perform at least one of the functions described herein. It is also assumed that a first function is a function for creating text information and a second function is a function for processing text information.

Figure 2:
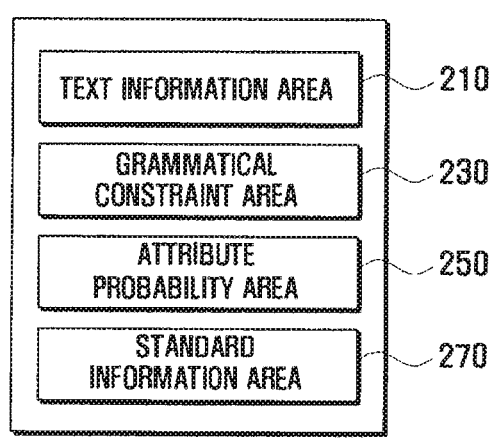
FIG. 2 is a block diagram of a memory unit of the communication terminal in FIG. 1.
Figure 3:
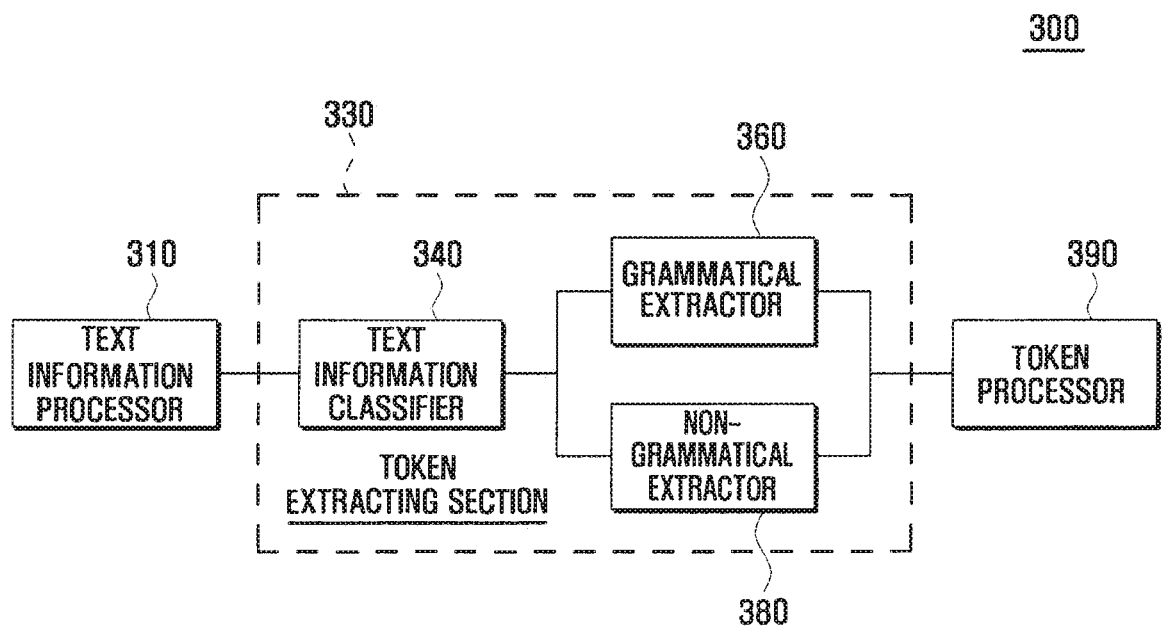
FIG. 3 is a block diagram of a control unit of the communication terminal in FIG. 1.
Figure 4:
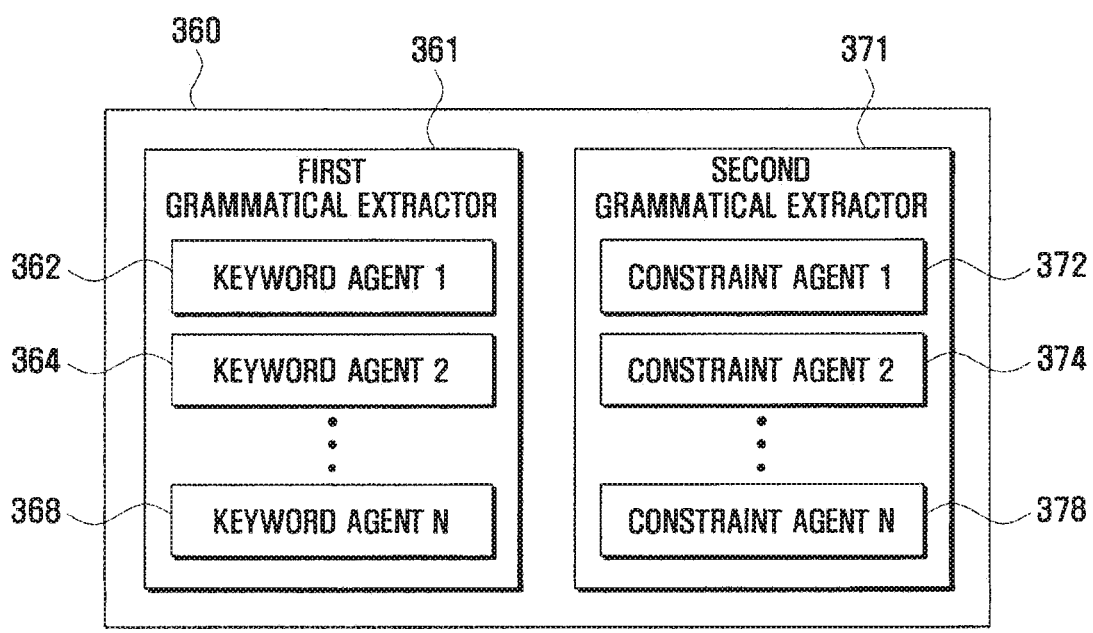
FIG. 4 is a block diagram of a grammatical extracting section of the control unit in FIG. 3.
Figure 5:
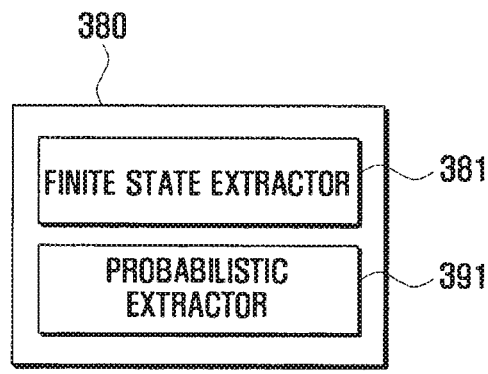
FIG. 5 is a block diagram of a non-grammatical extracting section of the control unit in FIG. 3.

FIG. 2 illustrates a memory unit of the communication terminal in FIG. 1; FIG. 3 illustrates a control unit of the communication terminal in FIG. 1; FIG. 4 illustrates a grammatical extracting section of the control unit in FIG. 3; and FIG. 5 illustrates a non-grammatical extracting section of the control unit in FIG. 3.

Referring to FIG. 1, the communication terminal 10 includes a radio communication unit 100, memory unit 200, control unit 300, display unit 400, and key input unit 500.

The radio communication unit 100 performs wireless communication for the communication terminal 10. The radio communication unit 100 includes a radio frequency (RF) transmitter for up-converting the frequency of a signal to be transmitted and amplifying the signal, and an RF receiver for low-noise amplifying a received signal and down-converting the frequency of the received signal.

The memory unit 200 can include a program storage section and a data storage section. The program storage section stores programs for controlling the overall operation of the communication terminal 10. In particular, the program storage section can store programs for managing text information. The data storage section stores data generated by execution of the programs. As shown in FIG. 2, the memory unit 200 includes a text information area 210, grammatical constraint area 230, attribute probability area 250, and standard information area 270.

The text information area 210 can store text information matched with a first function, and tokens of text information matched with a second function. The grammatical constraint area 230 stores preset grammatical constraints. The grammatical constraint area 230 can store grammatical constraints for their corresponding attribute keywords. The attribute probability area 250 stores preset attribute probabilities. That is, the attribute probability area 250 stores first attribute probabilities and second attribute probabilities. The attribute probability area 250 further stores reference probabilities. The standard information area 270 stores standard information used for refining tokens according to preset criteria.

The control unit 300 controls the overall operation of the communication terminal 10. The control unit 300 includes a data processor that encodes and modulates a signal to be transmitted, and demodulates and decodes a received signal. The data processor can include a modulator/demodulator (modem) and a coder/decoder (codec). The codec includes a data codec for processing packet data, and an audio codec for processing an audio signal such as a voice signal. As shown in FIG. 3, the control unit 300 includes a text information processor 310, token extracting section 330, and token processor 390.

The text information processor 310 extracts, when text information is created through a first function, descriptive data of the text information. The text information processor 310 corrects spelling and spacing errors in text information.

The token extracting section 330 extracts tokens from text information. There to, the token extracting section 330 includes a text information classifier 340, grammatical extractor 360, and non-grammatical extractor 380. The text information classifier 340 determines whether tokens in text information are arranged in accordance with a grammatical constraint, and classifies the text information on the basis of the determination. If tokens in text information are arranged in accordance with a grammatical constraint, the grammatical extractor 360 extracts tokens from the text information according to the grammatical constraint. That is, the grammatical extractor 360 extracts tokens at preset positions. If tokens in text information are not arranged in accordance with a grammatical constraint, the non-grammatical extractor 380 checks attribute probabilities of characters, and extracts one or more of the characters having an attribute probability greater than the reference probability as a token. The non-grammatical extractor 380 extracts a token on the basis of attribute probabilities.

As shown in FIG. 4, the grammatical extractor 360 includes a first grammatical extractor 361 and second grammatical extractor 371. When text information containing an attribute keyword is created in a standardized format, the first grammatical extractor 361 extracts tokens at preset positions of the text information. The first grammatical extractor 361 includes a plurality of keyword agents 362 to 368, which extract tokens according to their grammatical constraints matched with different attribute keywords. For example, the first grammatical extractor 361 can extract tokens from text information in a standardized format like credit card billing information. In text information containing an attribute keyword, the second grammatical extractor 371 extracts a token that is adjacent to the attribute keyword. The second grammatical extractor 371 includes a plurality of constraint agents 372 to 378, which extract tokens according to their grammatical constraints matched with different attribute keywords.

As shown in FIG. 5, the non-grammatical extractor 380 includes a finite state extractor 381 and probabilistic extractor 391. The finite state extractor 381 extracts tokens according to a finite state constraint. The finite state extractor 381 can be a finite state machine that sequentially extracts characters corresponding to tokens. The finite state extractor 381 sequentially analyzes characters in text information. A finite state constraint is a set of finite characters defined for extractability. For example, the set of digits 0 to 9 is a finite state constraint. When characters are composed of one or more consecutive digits, the finite state extractor 381 can extract the consecutive digits as a token. The probabilistic extractor 391 finds in sequence attribute probabilities of characters in text information, and extracts one or more of the characters having an attribute probability greater than the reference probability as a token. The probabilistic extractor 391 can be a naive Bayes classifier.

The token processor 390 analyzes extracted tokens, selects a second function to handle the extracted tokens, and executes the second function. The token processor 390 can also utilize descriptive data in execution of the second function.

The display unit 400 (FIG. 1) displays user data from the control unit 300. The display unit 400 can include a panel of liquid crystal display (LCD) devices, an LCD controller, and a video memory for storing video data. If the panel has a touch screen, the display unit 400 can also act as an input means. The touch screen detects an action such as touch, drop, or drag on the basis of a change in a physical quantity such as electrostatic capacity, and converts the physical change into a touch signal.

The key input unit 500 (FIG. 1) includes keys for inputting text information, and function keys for setting various functions.

Figure 6:
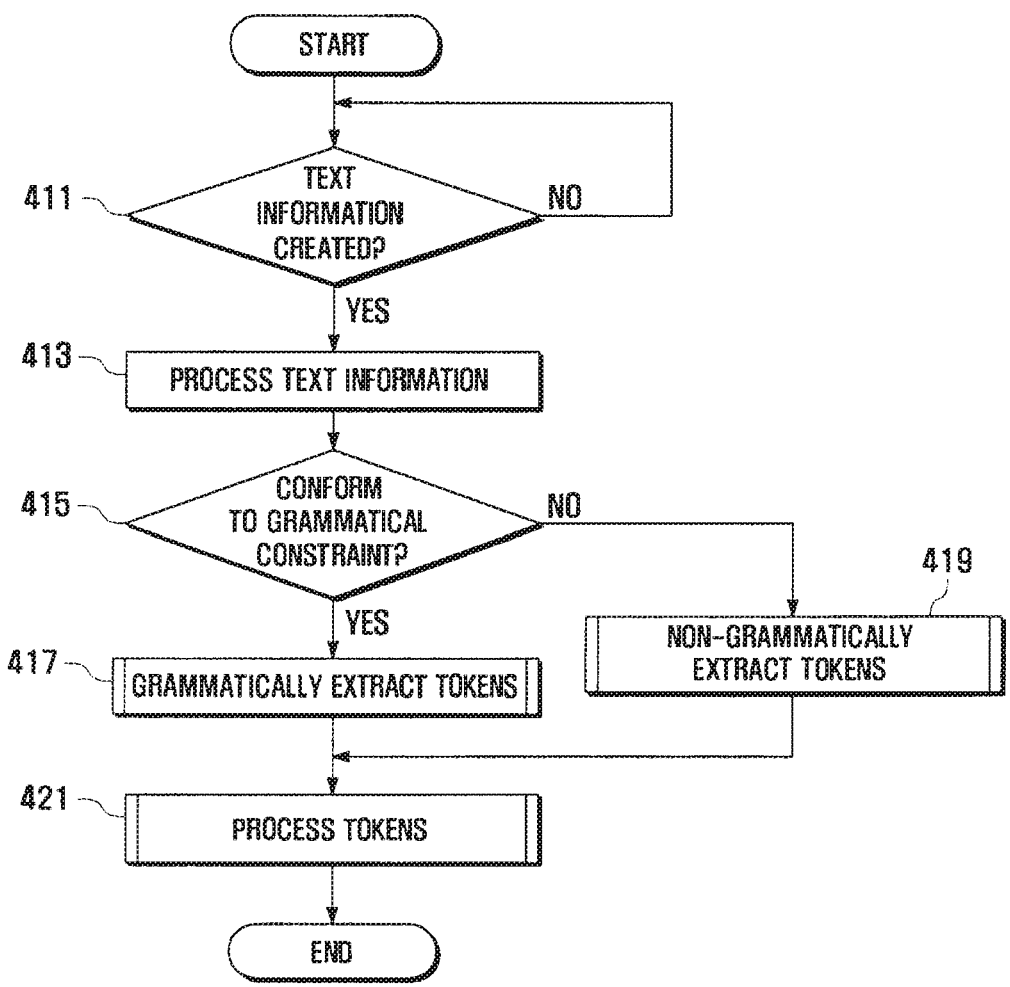
FIG. 6 is a flow chart for a method of managing text information according to another exemplary embodiment of the present invention.

FIG. 6 is a flow chart for a method of managing text information according to an exemplary embodiment of the present invention. FIG. 7A to 7D are screen representations for the method illustrated in FIG. 6. The screens represented by FIG. 7A (a), FIG. 7B (a), FIG. 7C (a) and FIG. 7D (a) are related to creation of text information; and the screens represented by FIG. 7A (b), FIG. 7B (b), FIG. 7C (b) and FIG. 7D (b) are related to processing of tokens.

Figure 7C:
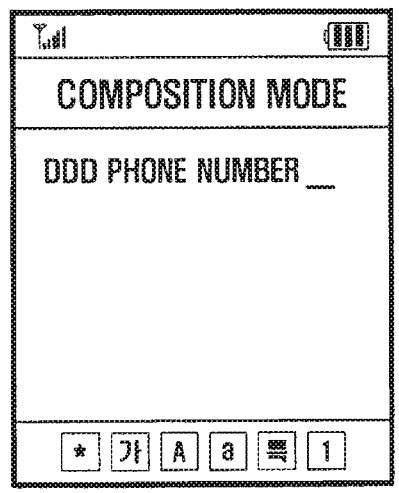
Figure 7C:
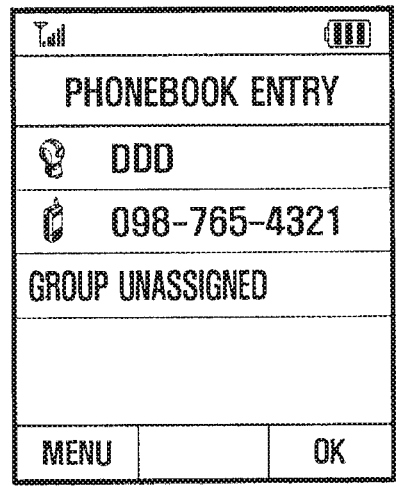
Figure 7D:
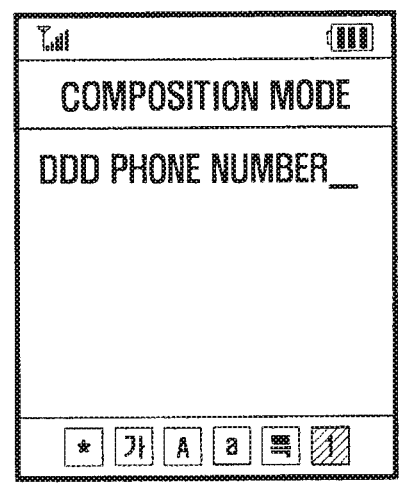
Figure 7D:
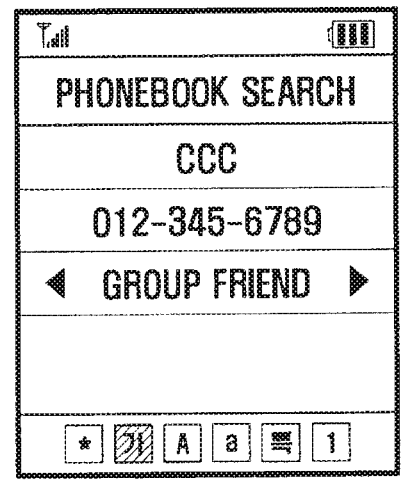

Referring to FIG. 6 for the method of managing text information, the control unit 300 of the communication terminal 10 checks whether text information is created through a first function (S411). When text information is created, the control unit 300 processes the text information (S413). At step S413, the control unit 300 can store the text information in correspondence with the first function. For example, when a short message containing text information is received as shown by FIG. 7A (a) or FIG. 7B (a), or when text information is created in a text composition mode as shown by FIG. 7C (a) or FIG. 7D (a), the control unit 300 detects creation of the text information at step S411, and processes the text information at step S413. During the processing, the control unit 300 extracts descriptive data associated with the text information, and can correct spelling and spacing errors in the text information according to a preset scheme. Examples of extracted descriptive data and text information are illustrated in Table 1.

TABLE 1

| Subject | Jane | AA CARD | | |
|---|---|---|---|---|
| Text information | See you at LMN park April 5 12 h | AA CARD approved April 1 11 h 40 m BB gas station 50,000 Won | CCC012-345-6789 | DDDphone-number |

TABLE 1-continued

| Subject | Jane | AA CARD | | |
|---|---|---|---|---|
| | | (lump sum) | | |
| Creation time | 10:30 | 11:45 | 11:20 | 11:25 |
| Creation date | 2008 Mar. 29 | 2008 Apr. 1 | 2008 Apr. 2 | 2008 Apr. 2 |
| First function | short message | short message | composition | composition |

Thereafter, the control unit 300 checks whether the text information conforms to a grammatical constraint stored in the grammatical constraint area 230 (S415). That is, the control unit 300 analyzes each character in the text information to examine whether tokens are arranged in accordance with grammatical constraints. Here, the control unit 300 can determine whether an attribute keyword is present in the text information.

If the text information conforms to a grammatical constraint, the control unit 300 grammatically extracts tokens from the text information (S417). That is, the control unit 300 extracts tokens according to a grammatical constraint matched with an attribute keyword. A procedure of grammatically extracting tokens is described in more detail in connection with FIG. 8.

Figure 8:
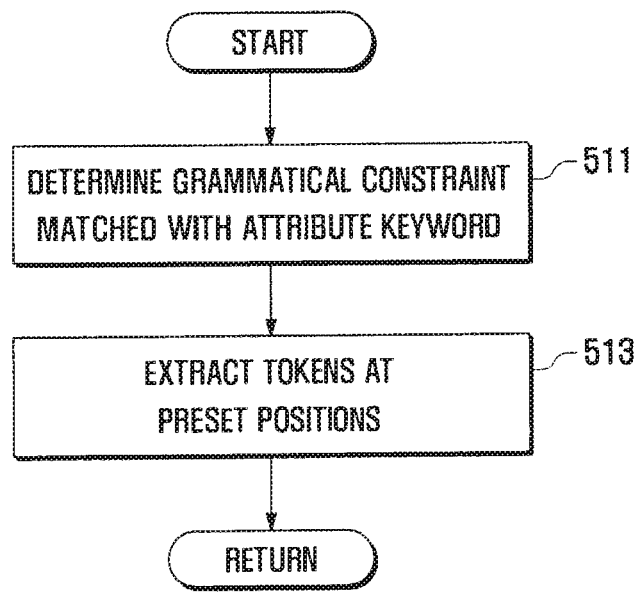
FIG. 8 is a flow chart for a procedure of grammatically extracting tokens in the method of FIG. 6.

FIG. 8 is a flow chart for a procedure of grammatically extracting tokens in the method of FIG. 6.

Referring to FIG. 8, the control unit 300 determines the grammatical constraint associated with an attribute keyword (S511). That is, the control unit 300 identifies the positions of tokens to be extracted, which are preset according to the associated attribute keyword, in the text information. The grammatical constraint area 230 can store grammatical constraints associated with attribute keywords as a grammatical constraint table as shown in Table 2. In the grammatical constraint table, second functions can be further stored to process tokens extracted according to grammatical constraints. The control unit 300 extracts tokens at positions defined by the determined grammatical constraint in the text information (S513), and returns to FIG. 6.

TABLE 2

| attribute keyword | grammatical constraint | second function |
|---|---|---|
| AA card | [card-company]approved[date][time][store][amount] | housekeeping book management |
| ZZ card | ([card-company][time][store](zero-interest, [amount]) | |
| ** | **[name] | |
| phone number | [name]phone-number | phonebook search |
| phone # | [name]phone #[name][phone-number] | phonebook entry |
| — | — | — |

For example, when text information is "AA card approved Apr. 01 11 h 40 m BB gas station 50,000 Won (lump sum)", the control unit 300 can extract tokens according to the grammatical constraint matched with an attribute keyword 'AA card' as illustrated in Table 3. When text information is "# CCC012-345-6789", the control unit 300 can extract tokens according to the grammatical constraint matched with an attribute keyword '#' as illustrated in Table 4.

TABLE 3

| attribute | card company | payment date | payment time | store | payment option | amount |
|---|---|---|---|---|---|---|
| token | AA card | Apr. 01 | 11 h 40 m | BB gas station | lump sum | 50,000 Won |

TABLE 4

| attribute | name | phone number |
|---|---|---|
| token | CCC | 012-345-6789 |

Referring back to FIG. 6, if the text information does not conform to a grammatical constraint, the control unit 300 extracts tokens not associated with a grammatical constrain (non-grammatical token) from the text information (S419). That is, the control unit 300 extracts a token by combining and analyzing one or more consecutive characters in the text information. A procedure of extracting non-grammatical tokens is described in more detail in connection with FIG. 9.

Figure 9:
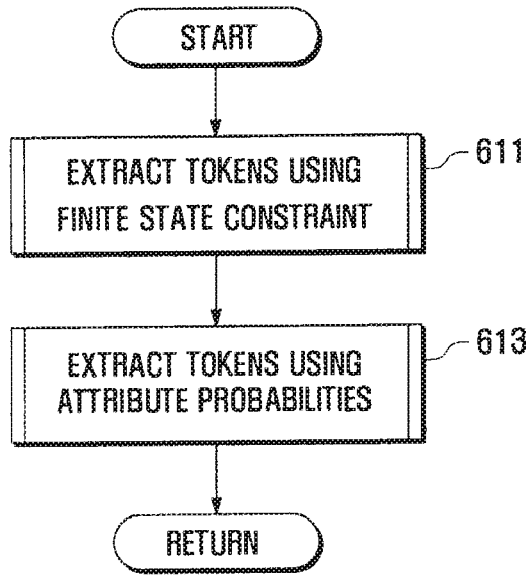
FIG. 9 is a flow chart for a procedure of non-grammatically extracting tokens in the method of FIG. 6.

FIG. 9 is a flow chart for a procedure of extracting non-grammatical tokens in the method of FIG. 6.

Referring to FIG. 9, the control unit 300 extracts a token according to a finite state constraint (S611). A finite state constraint is a set of finite characters defined for extractability. For example, the set of digits 0 to 9 is a finite state constraint. At step S611, the control unit 300 analyzes in sequence characters in the text information, and, if one or more consecutive digits are found, can extract the digits as a token. Here, the control unit 300 can extract a token related to an attribute such as date, time, or monetary amount. For example, when one or more digits are followed by one or more characters such as 'day', 'month', 'today' or 'Monday', the finite state extractor 381 can extract a token related to date. When one or more digits are followed by one or more characters such as 'PM', 'AM' or 'later', the finite state extractor 381 can extract a token related to time. When one or more digits are followed by one or more characters such as 'won', 'dollar', 'W' or '$', the finite state extractor 381 can extract a token related to currency. Further, the finite state extractor 381 may extract a token related to a day of the week by analyzing a sequence of characters in the text information.

Thereafter, the control unit 300 extracts tokens using attribute probabilities (S613), and returns to FIG. 6. At step S613, the control unit 300 checks in sequence attribute probabilities of characters in the text information, and can extract one or more characters having an attribute probability higher than the reference probability as a token. In this case, extracted tokens can be related to an attribute of time or location.

Extraction of tokens using attribute probabilities is described in more detail in connection with FIG. 10.

Figure 10:
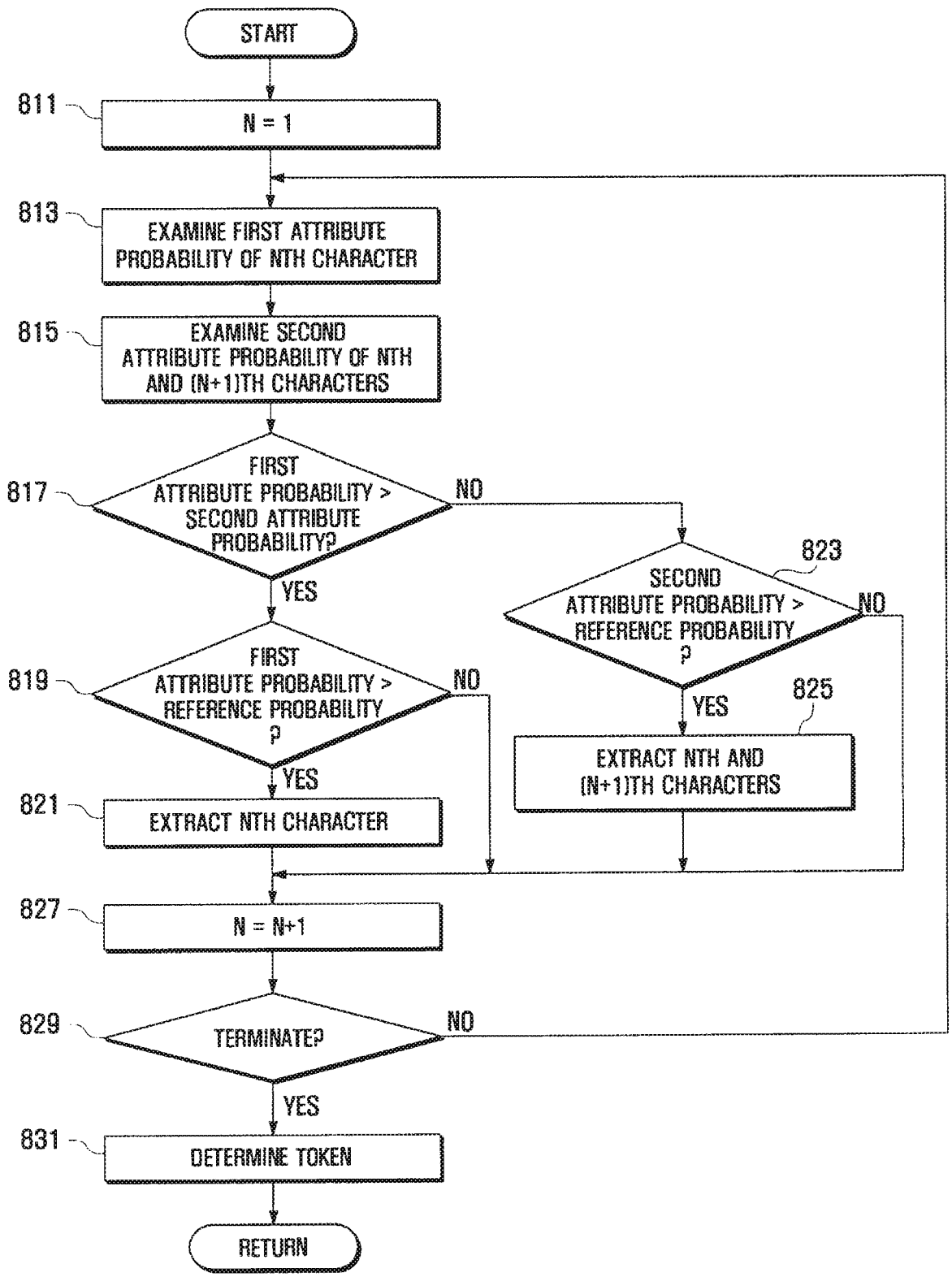
FIG. 10 is a flow chart for a step of extracting tokens using attribute probabilities in the procedure of FIG. 9.

FIG. 10 is a flow chart for a step of extracting tokens using attribute probabilities in the procedure of FIG. 9.

Referring to FIG. 10, the probabilistic extractor 391 initializes a variable N to 1 (S811). N indicates the position in text information of a character being checked. That is, the first one of characters in the text information is analyzed first. The probabilistic extractor 391 examines the first attribute probability of an Nth character (S813), and examines the second attribute probability of a combination of the Nth and the (N+1)th characters (S815). Here, the attribute probability area 250 can store attribute probabilities of characters or character combinations in an attribute probability table as shown in Table 5. In the attribute probability table, the attribute probability of a character or character combination can be labeled as B (beginning) when the character or character combination is the beginning of a token, labeled as I (inside) when the character or character combination is a middle one of a token, labeled as E (end) when the character or character combination is the ending of a token, and labeled as S (single) when the character is a single character token. Additionally, in the attribute probability table, the attribute probability of a character or character combination can be labeled as L (location) when the character or character combination is a token with a location attribute, and labeled as C (content) when the character or character combination is a token with a content attribute.

TABLE 5

| character | attribute probability (reference probability = 0.01) | | | | | | | | |
|---|---|---|---|---|---|---|---|---|---|
| | LB | LI | LE | LS | CB | CI | CE | CS | O |
| p | 0.05 | 0.00 | 0.30 | 0.00 | 0.01 | 0.00 | 0.00 | 0.00 | 0.00 |
| pa | 0.01 | 0.00 | 0.00 | 0.00 | 0.00 | 0.00 | 0.00 | 0.00 | 0.00 |
| ar | 0.00 | 0.01 | 0.00 | 0.00 | 0.01 | 0.00 | 0.00 | 0.00 | 0.00 |
| rk | 0.00 | 0.00 | 0.01 | 0.00 | 0.00 | 0.00 | 0.00 | 0.00 | 0.00 |
| k | 0.01 | 0.02 | 0.03 | 0.00 | 0.01 | 0.00 | 0.00 | 0.00 | 0.00 |

For example, the text information is "at park", the probabilistic extractor 391 examines the attribute probability of 'p' and the attribute probability of 'pa'. In Table 5, for 'p', the value labeled LB is highest and the probabilistic extractor 391 can set the attribute probability of 'p' to 0.05. For 'pa', the value labeled LB is highest and the probabilistic extractor 391 can set the attribute probability of 'pa' to 0.01. Note that the label LB indicates the attribute probability to locate the first position of string of tokens that the identification keyword indicate the place.

The probabilistic extractor 391 checks whether the first attribute probability of the Nth character is higher than the second attribute probability of the combination of the Nth and the (N+1) characters (S817). If the first attribute probability is higher than the second attribute probability, the probabilistic extractor 391 checks whether the first attribute probability is higher than the reference probability (S819). If the first attribute probability is higher than a reference probability, the probabilistic extractor 391 extracts the Nth character as a part of a token. For example, as the attribute probability of 'p' is higher than that of 'pa' and the reference probability, the probabilistic extractor 391 extracts 'p' as the initial character of a token.

If the first attribute probability is not higher than the second attribute probability, the probabilistic extractor 391 checks whether the second attribute probability is higher than the reference probability (S823). If the second attribute probability is higher than the reference probability, the probabilistic extractor 391 extracts the combination of the Nth and the (N+1)th characters as a part of a token (S825).

Thereafter, the probabilistic extractor 391 increments the variable N by 1 to analyze the next character (S827). The probabilistic extractor 391 checks whether the next character to be analyzed is present (S829). If the next character to be analyzed is not present, the probabilistic extractor 391 determines a token (S831) based on the extracted data, and processing is completed. If the next character to be analyzed is present, the probabilistic extractor 391 returns to step S813 for processing the next character.

For example, the probabilistic extractor 391 examines the attribute probabilities of 'rk' and 'k'. For 'rk', the value for the ending of a token is highest and the probabilistic extractor 391 sets the attribute probability of 'rk' to that value. For 'k', the value for the ending of a token is highest and the probabilistic extractor 391 sets the attribute probability of 'k' to that value. As the attribute probability of 'k' is higher than that of 'rk', the probabilistic extractor 391 can extract 'k' as the ending of a token. As a result, the probabilistic extractor 391 can extract a token 'park' with the beginning 'p' and the ending 'k' in relation to a location attribute. Note a "pa" and an "rk" are simple example of string of tokens. Accordingly, "par" can be string of tokens. Hence, Table 5 indicates that "pa", "ar" and other string of tokens unstated in table 5 can be sting of tokens.

In the above description on the use of attribute probabilities, to extract a token, the probabilistic extractor 391 compares the first attribute probability of the Nth character with the second attribute probability of a combination of the Nth and the (N+1)th characters. However, the probabilistic extractor 391 may also compare the first attribute probability of the (N−1)th character with the second attribute probability of a combination of the (N−1)th and the Nth characters. Further, to extract a token, the probabilistic extractor 391 compares the first attribute probability of a single character with the second attribute probability of a combination of two consecutive characters. However, the probabilistic extractor 391 may also compare the first attribute probability of a single character with the second attribute probability of a combination of two or more characters.

The finite state extractor 381 and probabilistic extractor 391 can extract tokens as shown in Table 6.

TABLE 6

| date | time | location |
|---|---|---|
| April 5 | 12 h | LMN park |

For example, when text information is "See you at LMN park April 05 12 h", the finite state extractor 381 can extract tokens 'April 05' and '12 h', and the probabilistic extractor 391 can extract a token 'LMN park'.

Referring back to FIG. 6, the control unit 300 processes the extracted tokens (S421). The control unit 300 can match, at least in part, the descriptive data and extracted tokens with the second function. For example, the token processor 390 can process descriptive data and tokens as shown in FIG. 7A (b), FIG. 7B (b), FIG. 7C (b) and FIG. 7D (b).

Figure 11:
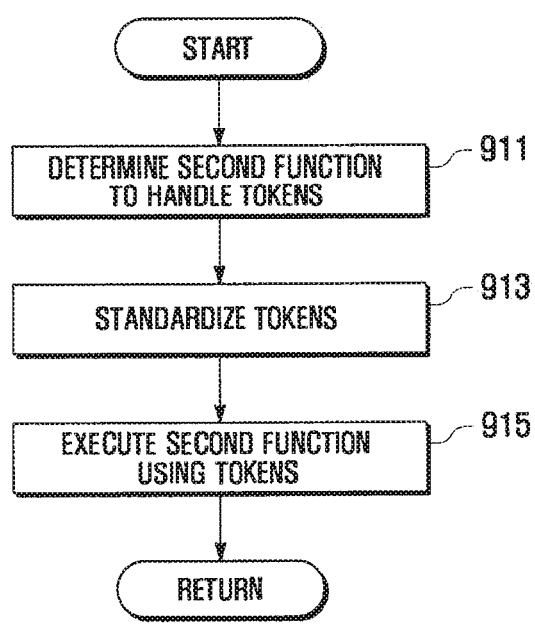
FIG. 11 is a flow chart for a procedure of processing tokens in the method of FIG. 6.

Next, a procedure of processing tokens is described in detail with reference to FIG. 11. FIG. 11 is a flow chart for a procedure of processing tokens in the method of FIG. 6.

Referring to FIG. 11, the control unit 300 analyzes extracted tokens and determines a second function to handle the tokens (S911). The control unit 300 can determine a second function matched with an attribute keyword of text information as illustrated in Table 2. The control unit 300 can also determine a second function on the basis of extracted tokens. For example, when tokens extracted from the same text information are related to date, time and location attributes as illustrated in Table 6, the control unit 300 can select a schedule management function as a second function.

The control unit 300 standardizes tokens according to preset formats (S913). For example, the control unit 300 may standardize the formats of tokens related to date, time and currency. The control unit 300 may standardize tokens according to creation date and time. The token processor 390 can standardize tokens on the basis of standardization information stored in the standard information area 270. The standard information area 270 can store a standardization table as shown in Table 7.

TABLE 7

| attribute | token | standard format |
|---|---|---|
| date | MM month DD day | YYYYMMDD |
| | MM/DD | |
| | DD day | |
| | today | |
| | Wednesday | |
| | weekend | |
| time | hh hour | hhmm |
| | hh hour mm minutes | |
| — | — | — |

For example, when a token is 'April 5' or '04/05' and its creation date is 'Apr. 5, 2008', the control unit 300 can standardize 'April 5' or '04/05' into '20080405'. When a token is '5D' and its creation date is 'Mar. 29, 2008', the control unit 300 can standardize '5D' into a form of '20080405' (after the creation date).

Thereafter, the control unit 300 executes the determined second function using the tokens (S915). The control unit 300 may rearrange the tokens in a form applicable to the second function before execution.

As apparent from the above description, when text information is created through one function of a communication terminal, tokens can be extracted from the text information and input to another function for further processing. Hence, the text information can be shared between multiple functions, and the user can easily manage text information in the communication terminal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method of providing a user interface executed by an electronic device, the method comprising:
   receiving a message containing text information via a messaging application executed by a processor of the electronic device;
   extracting, when the message containing the text information is received, at least one keyword from the text information;
   determining at least one function corresponding to the extracted at least one keyword, among functions of a plurality of different applications; and
   processing, when executing the at least one function, the at least one keyword as input to the at least one function.

2. The method of claim 1, wherein the extracting further comprises:
   identifying a first attribute probability of a character in the text information and a second attribute probability of two or more consecutive characters; and
   extracting, when one of the first attribute probability or second attribute probability is higher than a reference probability, at least one character whose first or second attribute probability is higher than the reference probability as a part of the at least one keyword.

3. The method of claim 2, wherein the extracting further comprises:
   extracting consecutive digits as the at least one keyword.

4. The method of claim 1, wherein the extracting further comprises:
   extracting the at least one keyword according to a preset grammatical constraint that is predetermined corresponding to the at least one keyword.

5. The method of claim 1, wherein the at least one function is one of a schedule entry function, a housekeeping book entry function, a phonebook search function, navigation function, or a phonebook entry function.

6. The method of claim 1, wherein the at least one function is executed using descriptive data including creation date, creation time, and target of the text information.

7. The method of claim 1, wherein the message is received in connection with a function of the electronic device including at least one of short message function, multimedia message function, e-mail function, or memo function.

8. The method of claim 1, wherein the extracted at least one keyword represents scheduling information and the at least one function is determined based on the scheduling information to be a schedule entry function, which uses the scheduling information as inputs.

9. The method of claim 1, wherein the extracted at least one keyword represents purchase information, and the at least one function is determined based on the purchase information to be a housekeeping book entry function, which uses the purchase information as inputs.

10. An electronic device comprising:
    an input device configured to receive an input for a short message;
    a radio communication circuit configured to receive data including a short message; and
    a processor configured to:
    receive a message containing text information via a messaging application executed by a processor of the electronic device;

extract, when the message containing the text information is received, at least one keyword from the text information;
determine at least one function corresponding to the extracted at least one keyword, among functions of a plurality of different applications; and
process, when executing the at least one function, the at least one keyword as input to the at least one function.

11. The electronic device of claim 10, wherein the processor is further configured to:
identify a first attribute probability of a character in the text information and a second attribute probability of two or more consecutive characters; and
extract, when one of the first attribute probability or second attribute probability is higher than a reference probability, at least one character whose first or second attribute probability is higher than the reference probability as a part of the at least one keyword.

12. The electronic device of claim 11, wherein the processor is further configured to:
extract consecutive digits as the at least one keyword.

13. The electronic device of claim 10, wherein the processor is further configured to:
extract the at least one keyword according to a preset grammatical constraint that is predetermined corresponding to the at least one keyword.

14. The electronic device of claim 10, wherein the at least one function is one of a schedule entry function, a housekeeping book entry function, a phonebook search function, navigation function, or a phonebook entry function.

15. The electronic device of claim 10, wherein the processor is further configured to execute the at least one function using descriptive data including creation date, creation time, and target of the text information.

16. The electronic device of claim 10, wherein the message is received in connection with a function of the electronic device including at least one of short message function, multimedia message function, e-mail function, or memo function.

17. The electronic device of claim 10, wherein the extracted at least one keyword represents scheduling information and the at least one function is determined based on the scheduling information to be a schedule entry function, which uses the scheduling information as inputs.

18. The electronic device of claim 10, wherein the extracted at least one keyword represents purchase information, and the at least one function is determined based on the purchase information to be a housekeeping book entry function, which uses the purchase information as inputs.

* * * * *